US011803212B2

(12) United States Patent
Jung et al.

(10) Patent No.: US 11,803,212 B2
(45) Date of Patent: Oct. 31, 2023

(54) FOLDABLE DISPLAY DEVICE AND DRIVING METHOD THEREOF

(71) Applicant: LG Display Co., Ltd., Seoul (KR)

(72) Inventors: Boyun Jung, Seoul (KR); SeungTaek Oh, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/976,592

(22) Filed: Oct. 28, 2022

(65) Prior Publication Data

US 2023/0205275 A1   Jun. 29, 2023

(30) Foreign Application Priority Data

Dec. 28, 2021   (KR) .......................... 10-2021-0189545

(51) Int. Cl.
*G06F 3/041*   (2006.01)
*G06F 1/16*   (2006.01)

(52) U.S. Cl.
CPC .......... *G06F 1/1652* (2013.01); *G06F 1/1686* (2013.01)

(58) Field of Classification Search
CPC ...... G06F 1/1652; G06F 1/1686; G09F 9/301; G09G 2380/02
See application file for complete search history.

(56) References Cited

U.S. PATENT DOCUMENTS

| 9,271,433 | B2 * | 2/2016 | Ryu | H05K 1/0277 |
| 10,791,636 | B2 * | 9/2020 | Andou | H10K 71/00 |
| 2006/0139273 | A1 * | 6/2006 | Harada | G09G 3/3614 |
| | | | | 345/89 |
| 2017/0132991 | A1 * | 5/2017 | Hwang | G06F 16/9554 |
| 2020/0243007 | A1 | 7/2020 | Jeon et al. | |
| 2021/0305201 | A1 * | 9/2021 | Park | H05K 3/328 |
| 2022/0229514 | A1 * | 7/2022 | Park | H10K 59/40 |
| 2023/0136429 | A1 * | 5/2023 | Park | H10K 59/126 |
| | | | | 257/40 |

FOREIGN PATENT DOCUMENTS

| KR | 10-2020-0094862 A | 8/2020 |
| KR | 10-2021-0082846 A | 7/2021 |

* cited by examiner

*Primary Examiner* — Joe H Cheng
(74) *Attorney, Agent, or Firm* — Morgan, Lewis & Bockius LLP (57) ABSTRACT

A foldable display device may include: a display panel including a first active area, a second active area, and a foldable area between the first active area and the second active area for folding and unfolding the display panel; and a camera in the second active area or overlapping with the second active area. The first active area may be configured to display a test pattern, and the camera may be configured to capture the test pattern to output captured data for compensating a data voltage applied to at least one of the first active area and the second active area of the display panel for displaying an image.

20 Claims, 8 Drawing Sheets

FOLDABLE DISPLAY DEVICE AND DRIVING METHOD THEREOF

CROSS-REFERENCE TO RELATED APPLICATIONS

This application claims the priority of Korean Patent Application No. 10-2021-0189545 filed on Dec. 28, 2021, in the Korean Intellectual Property Office, the disclosure of which is incorporated herein by reference.

BACKGROUND

Technical Field

The present disclosure relates to a foldable display device and a driving method thereof and, more particularly, to a display device including a built-in camera and a driving method thereof.

Description of the Related Art

Among display devices used for a monitor of a computer, a television, or a cellular phone are an electroluminescent display device, which is a self-emitting device, and a liquid crystal display device (LCD), which requires a separate light source.

Possible applications for display devices are wide ranging and diversified to include personal digital assistants as well as monitors for computers and televisions. A display device with a large display area and a reduced volume and weight is being studied. Therefore, a foldable display device having a display unit and wiring lines on a flexible substrate to be freely folded or unfolded is being studied and developed.

However, the light emitting diodes may be degraded by repeatedly driving the foldable display device. Accordingly, the light emitting diodes may not produce a normal level of luminance so that the displayed image may be distorted.

SUMMARY

Accordingly, embodiments of the present disclosure are directed to a foldable display apparatus and a driving method thereof that substantially obviate one or more problems due to the limitations and disadvantages of the related art.

An object of the present disclosure is to provide a foldable display device configured to compensate for degradation by means of a built-in camera.

Another object of the present disclosure is to provide a foldable display device which may regularly compensate for degradation in accordance with a degradation level.

The objects, features, and aspects of the present disclosure are not limited to those mentioned above. Additional objects, features, and aspects will be set forth in part in the description that follows and in part will become apparent to those skilled in the art from the description or may be learned by practice of the inventive concepts provided herein. Other objects, features, and aspects of the inventive concepts may be realized and attained by the structure particularly pointed out in, or derivable from, the written description, the claims hereof, and the appended drawings.

To achieve these and other advantages and in accordance with the purpose of the disclosure, as embodied and broadly described herein, a foldable display device may include: a display panel including a first active area, a second active area, and a foldable area between the first active area and the second active area for folding and unfolding the display panel; and a camera in the second active area or overlapping with the second active area, wherein the first active area may be configured to display a test pattern, and the camera may be configured to capture the test pattern to output captured data for compensating a data voltage applied to at least one of the first active area and the second active area of the display panel for displaying an image.

In another aspect of the present disclosure, a method of driving a foldable display device including a display panel having a first active area, a second active area, and a foldable area between the first active area and the second active area, and a camera in or overlapping with the second active area, may include: displaying a test pattern in one or more regions of the first active area; capturing the test pattern with the camera to generate captured data; determining comparison data by comparing the captured data with stored reference data; and based on the comparison data, compensating a data voltage applied to at least one of the first active area and the second active area of the display panel for displaying an image or setting a next time period for the capturing of the test pattern to generate the captured data.

Other detailed matters of example embodiments are included in the detailed description and the drawings.

In a driving method of a foldable display device according to an example embodiment of the present disclosure, in a predetermined situation and a predetermined period, a test pattern displayed in at least one area of the first active area may be captured by the camera to compensate a data voltage of the display panel.

According to example embodiments of the present disclosure, a test pattern may be captured using a built-in camera to compensate for degradation.

According to example embodiments of the present disclosure, it may not be necessary to provide a separate camera for compensation of the degradation so that the degradation may be regularly compensated even after the product shipment.

According to example embodiments of the present disclosure, in a folded state in which the user does not use the foldable display device, the degradation compensation may be performed so that it is not necessary to employ a separate degradation compensation time.

The effects according to the present disclosure are not limited to the example effects described above, and various additional effects may be included in the present disclosure or may be achieved by the practice of the present disclosure.

It is to be understood that both the foregoing general description and the following detailed description of the present disclosure are by way of example and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure. In the drawings.

DETAILED DESCRIPTION

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the protected scope of the present disclosure is defined by claims and their equivalents.

The shapes, dimensions, ratios, angles, numbers, and the like, which are illustrated in the drawings to describe various example embodiments of the present disclosure, are merely given by way of example. Therefore, the present disclosure is not limited to the illustrations in the drawings. Like reference numerals generally denote like elements throughout the specification, unless otherwise specified.

In the following description, where the detailed description of the relevant known function or configuration may unnecessarily obscure a feature or aspect of the present disclosure, a detailed description of such known function of configuration may be omitted.

Where the terms "comprise," "have," "include," and the like are used, one or more other elements may be added unless the term, such as "only," is used. An element described in the singular form is intended to include a plurality of elements, and vice versa, unless the context clearly indicates otherwise.

In construing an element, the element is to be construed as including an error or tolerance range even where no explicit description of such an error or tolerance range is provided.

Where positional relationships are described, for example, where the positional relationship between two parts is described using "on," "over," "under," "above," "below," "beside," "next," or the like, one or more other parts may be located between the two parts unless a more limiting term, such as "immediate(ly)," "direct(ly)," or "close(ly)" is used. For example, where an element or layer is disposed "on" another element or layer, a third layer or element may be interposed therebetween.

Where an element or layer is referred to as being "on" or "connected to" another element or layer, it should be understood to mean that the element or layer may be directly on or directly connected to the other element or layer, or that intervening elements or layers may be present, unless otherwise specified. Also, where one element is referred to as being disposed "on" or "under" another element, it should be understood to mean that the elements may be so disposed to directly contact each other, or may be so disposed without directly contacting each other, unless otherwise specified.

Although the terms "first," "second," A, B, (a), (b), and the like may be used herein to describe various elements, these elements should not be interpreted to be limited by these terms as they are not used to define a particular order or precedence. These terms are used only to distinguish one element from another. For example, a first element could be termed a second element, and, similarly, a second element could be termed a first element, without departing from the scope of the present disclosure.

Since the dimensions and thickness of each component illustrated in the drawings are represented for convenience in explanation, the present disclosure is not necessarily limited to the illustrated dimensions and thickness of each component.

Features of various embodiments of the present disclosure may be partially or entirely coupled to or combined with each other. They may be linked and operated technically in various ways as those skilled in the art can sufficiently understand. The embodiments may be carried out independently of or in association with each other in various combinations.

Hereinafter, a foldable display device and a driving method thereof of the present disclosure will be described in detail with reference to the accompanying drawings.

Figure 1:
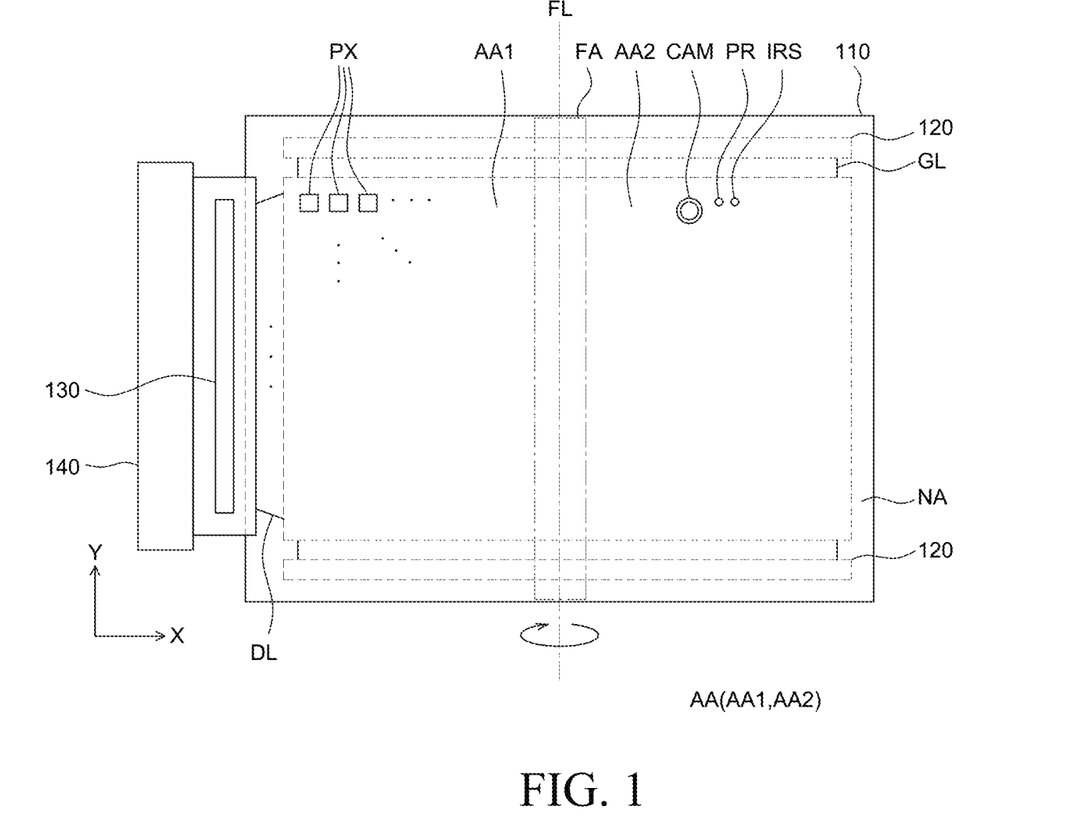
FIG. 1 is a view illustrating a foldable display device according to an example embodiment of the present disclosure.

FIG. 1 is a view illustrating a foldable display device according to an example embodiment of the present disclosure.

Figure 2:
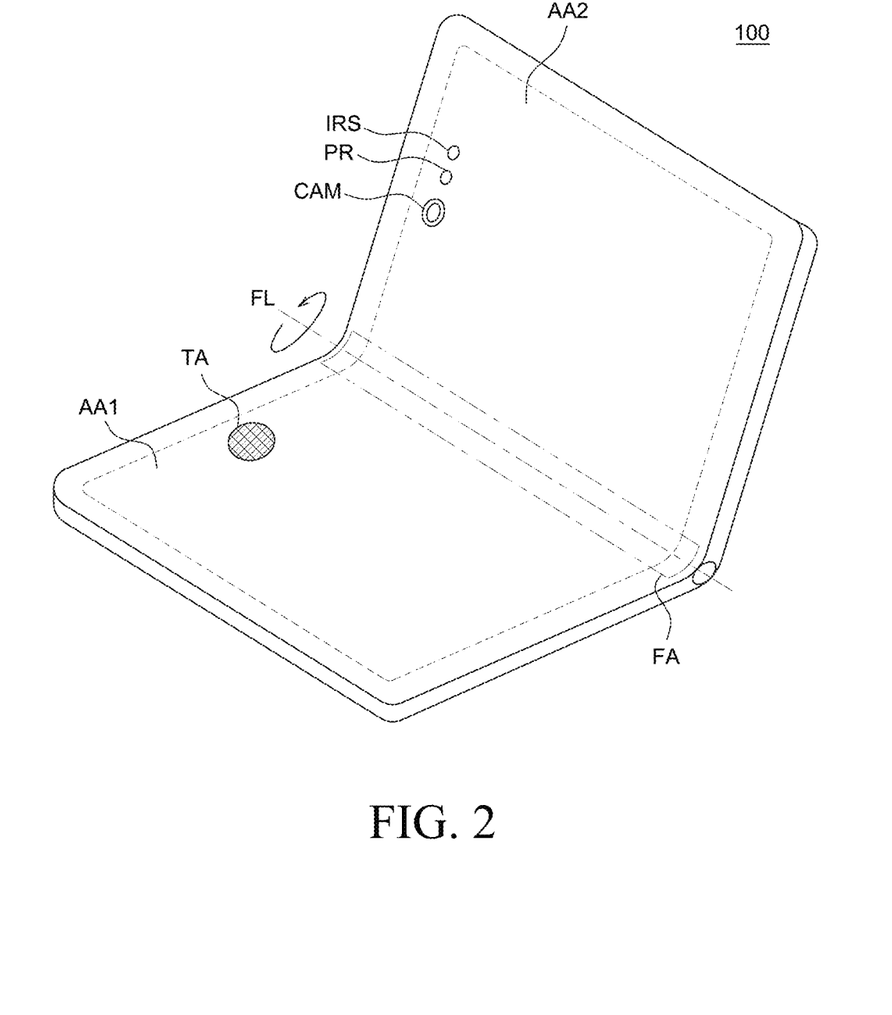
FIGS. 2 and 3 are views for explaining a folding process of a foldable display device according to an example embodiment of the present disclosure.
Figure 3:
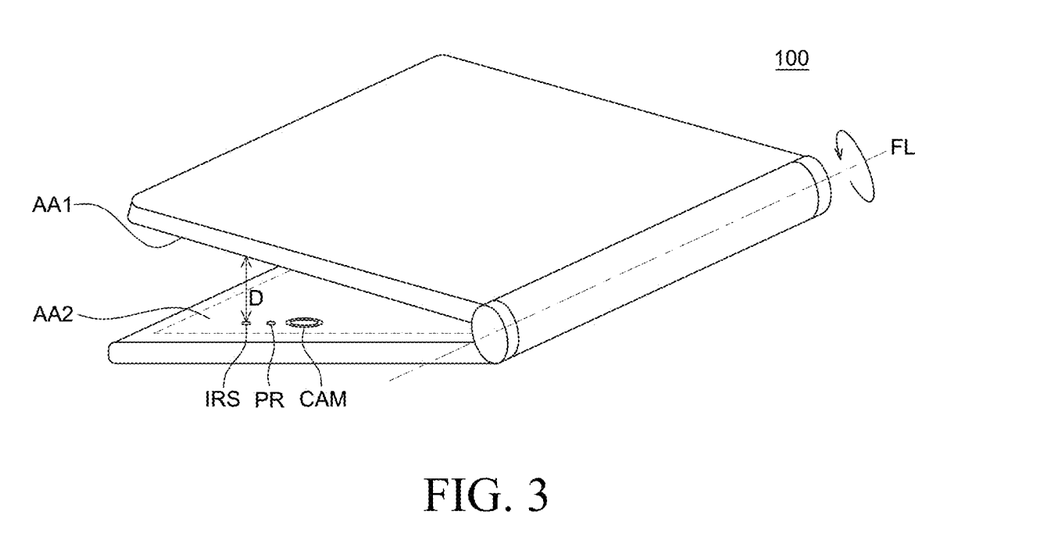

FIGS. 2 and 3 are views for explaining a folding process of a foldable display device according to an example embodiment of the present disclosure.

FIG. 2 illustrates a folded state of an example display device in which active areas AA1 and AA2 form an obtuse angle with respect to each other. FIG. 3 illustrates a folded state of an example display device in which active areas AA1 and AA2 form an acute angle with respect to each other.

As shown in FIG. 1, a foldable display device 100 according to an example embodiment of the present disclosure may include a display panel 110, a gate driver 120, a data driver 130, and a printed circuit board 140.

The display panel 110 may include a folding area FA which may be folded at a folding line FL, an active area AA in which an image may be displayed, and a non-active area NA which may enclose the active area AA.

The active area AA may be folded at the folding line FL disposed in the folding area FA. Accordingly, the active area AA may be divided into a first active area AA1 and a second active area AA2 divided by the folding line FL. That is, a boundary of the first active area AA1 and the second active area AA2 may correspond to the folding line FL.

In other words, the active area AA may be divided into the first active area AA1 and the second active area AA2 in the folding area FA. That is, the boundary of the first active area AA1 and the second active area AA2 may correspond to the folding area FA.

In other words, the active area AA may be divided into a folding area FA which may be folded with a specific radius of curvature and a non-folding area which extends to both sides of the folding area FA to maintain a flat state. That is, the non-folding areas may be defined with the folding area FA therebetween.

Even though FIG. 1 illustrates that the first active area AA1 and the second active area AA2 have substantially the same size, is the present disclosure is not limited thereto. The sizes of the first active area AA1 and the second active area AA2 may be configured to be different as needed.

In the active area AA, a plurality of gate lines GL and a plurality of data lines DL intersecting in a matrix may be disposed. A plurality of pixels PX may be defined by the plurality of gate lines GL and the data lines DL. Each of the plurality of pixels PX may include at least one thin film transistor.

Each of the plurality of pixels PX may include a red sub pixel which emits red light, a green sub pixel which emits green light, and a blue sub pixel which emits blue light. However, it is not limited thereto, and each of the plurality of pixels PX may further include a white sub pixel which emits white light.

Further, where the foldable display device 100 according to the exemplary embodiment of the present disclosure is an organic light emitting display device, current may be applied to an organic light emitting diode incorporated in the plurality of pixels PX, and discharged electrons and holes may be coupled to generate excitons. The excitons may emit light to implement a gray scale of the organic light emitting display device.

With regard to this, the foldable display device 100 according to an example embodiment of the present disclosure is not limited to the organic light emitting display device but may be one of various types of display devices, such as a liquid crystal display device.

Even though it is not illustrated in the drawing, depending on a particular application or design, touch electrodes for sensing a touch may be disposed above or in the display panel 110 in a matrix form. Therefore, the foldable display device 100 according to an example embodiment of the present disclosure may use a touch electrode to sense a touch applied to the display panel 110.

The touch sensing of the foldable display device 100 may be performed by a self-capacitive method to sense a self-capacitance of the touch electrode or a by a mutual-capacitive method to sense the touch by the change in the mutual-capacitance of the reception touch electrode and the transmission touch electrode.

In the second active area AA2, a camera CAM, an illumination sensor PR, and an infrared sensor IRS may be disposed.

The camera CAM may be embedded in the second active area AA2 of the foldable display device 100. Therefore, as illustrated in FIG. 2, when the foldable display device 100 is folded at an obtuse angle, the camera CAM may capture the external background. Alternatively, as illustrated in FIG. 3, when the foldable display device 100 is folded at an acute angle, the camera CAM may capture a test pattern TA displayed in the first active area AA1 to generate captured data.

The above-described test pattern TA may include a red pattern, a green pattern, a blue pattern, and a white pattern. The red pattern, the green pattern, the blue pattern, and the white pattern may include a plurality of reference grayscale patterns. For example, the red pattern, the green pattern, the blue pattern, and the white pattern may include a first reference pattern expressing one gray scale, a second reference pattern expressing 31 gray scales, a third reference pattern expressing 127 gray scales, and a fourth reference pattern expressing 255 gray scales.

The above-described test pattern TA may be configured by a red pattern, a green pattern, a blue pattern, and a white pattern including a plurality of reference grayscale patterns. Therefore, each of the red pattern, the green pattern, the blue pattern, and the white pattern including the plurality of reference grayscale patterns may be captured by the camera CAM to generate a plurality of captured data.

The test pattern TA displayed in the first active area AA1 may be displayed in an area corresponding to the camera CAM disposed in the second active area AA2. Therefore, in the state in which the foldable display device 100 is fully folded, the camera CAM and the test pattern TA may overlap.

The illumination sensor PR may be embedded in the first active area AA1 or the second active area AA2 to measure external light. Specifically, the illumination sensor PR may be disposed at a peripheral portion of the second active area AA2 and may be disposed adjacent to the camera CAM. Therefore, the illumination sensor PR may determine the presence of the external light, and the camera CAM may capture the test pattern TA only when the external light is not present. In other words, only when the measured external light value generated by the illumination sensor PR measuring the external light is equal to or lower than an external light threshold value, the camera CAM may capture the test pattern TA to generate the captured data.

When the measured external light value is higher than the external light threshold value, the camera CAM may measure not only light emitted by the test pattern, but also external light. Therefore, only when the measured external light value is equal to or lower than the external light threshold value, the camera CAM may capture the test pattern TA to accurately generate the captured data.

The infrared sensor IRS may be embedded in the first active area AA1 or the second active area AA2 to measure a distance D between the first active area AA1 and the second active area AA2. Specifically, the infrared sensor IRS may be disposed at a peripheral portion of the second active area AA2 and may be disposed adjacent to the camera CAM. Therefore, the infrared sensor IRS may measure a distance D between the first active area AA1 and the second active area AA2, and the camera CAM may capture the test pattern TA according to the distance between the first active area AA1 and the second active area AA2. In other words, only when the distance between the first active area AA1 and the second active area AA2 measured by the infrared sensor IRS is equal to or lower than a distance threshold value, the camera CAM may capture the test pattern TA to generate the captured data.

When the distance measurement value D is higher than the distance threshold value, the camera CAM may measure not only light emitted by the test pattern TA, but also the external light, due to the greater space between the first active area AA1 and the second active area AA2. Therefore, only when the distance measurement value D is equal to or lower than the distance threshold value, the camera CAM may capture the test pattern TA to accurately generate the captured data.

The camera CAM embedded in the second active area AA2 may capture the test pattern TA displayed in the first active area AA1 so that the captured data may vary depending on the measured distance value D between the first active area AA1 and the second active area AA2. Accordingly, the captured data may vary depending on the measured distance value D.

The gate driver 120 may sequentially supply the gate voltage to the gate lines GL.

According to a driving method of an example embodiment, the gate driver 120 may be located only at one side of the display panel 110 or located at both sides based on an application or design employed. The gate driver 120 may be implemented in a gate in panel (GIP) manner to be integrated with the display panel 110.

Specifically, as illustrated in FIG. 1, the gate driver 120 may be disposed at both sides of the active area AA with respect to the Y axis direction on the display panel 110 and may extend in the X axis direction. In other words, the folding line FL may extend in the Y axis direction so that the gate driver 120 may extend in a direction perpendicular to the folding line FL. If the folding line FL is perpendicular to the gate driver 120, the position is not limited to the center and may vary according to an application or design employed.

Here, the gate driver 120 may include a shift register and a level shifter.

As shown in FIG. 1, the data driver 130 may supply the data voltage to the plurality of pixels PX disposed in the active area by means of the data lines DL.

The data driver 130 may be disposed on one side or both sides of the display panel 110 with respect to the X axis direction and may extend in the Y axis direction. In other words, the folding line FL may extend in the Y axis direction so that the gate driver 120 may extend in a direction parallel to the folding line FL.

However, even though FIG. 1 illustrates that one data driver 130 is employed at one side, the data driver 130 may be divided into two or more data integrated circuits corresponding to the plurality of active areas AA, depending on an application or design employed.

Here, the above-described data driver 130 may be disposed on a base film configured by an insulating material. That is, even though FIG. 1 illustrates that the data driver 130 is mounted in a chip on film (COF) manner, it is not limited thereto. For example, the data driver may include one or more driving ICs mounted in a chip on glass (COG) or a tape carrier package (TCP) manner.

The timing controller 140 may receive timing signals, such as a vertical synchronization signal, a horizontal synchronization signal, a data enable signal, or a dot clock, by means of a receiving circuit, such as an LVDS or TMDS interface, connected to a host system. The timing controller 140 may generate a data control signal to control the data driver 130 and gate control signals to control the gate driver 120, based on the input timing signals.

The timing controller 140 may process image data input from an external system suitable for a size and a resolution of the display panel 110 to convert the image data into a video data signal and then supply the video data signal to the data driver 130. Here, the timing controller 140 may be disposed as an IC chip formed on a printed circuit board.

Figure 4:
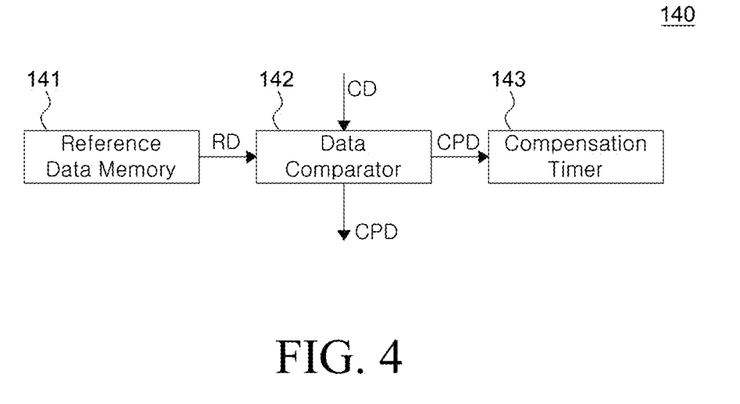
FIG. 4 is a block diagram for explaining a timing controller of a foldable display device according to an example embodiment of the present disclosure.

FIG. 4 is a block diagram for explaining a timing controller of a foldable display device according to an example embodiment of the present disclosure.

The timing controller 140 may include a reference data memory 141, a data comparator 142, and a compensation timer 143.

In the reference data memory 141, reference data RD generated by the camera CAM capturing the test pattern TA in the initial state of the foldable display device 100 is stored.

The initial state of the foldable display device 100 may refer to a time when the foldable display device 100 is shipped. That is, in the initial state, the light emitting diode of the foldable display device 100 is not degraded so that the plurality of pixels may be normally driven.

The above-described test pattern TA may be configured by a red pattern, a green pattern, a blue pattern, and a white pattern including a plurality of reference grayscale patterns.

Therefore, each of the red pattern, the green pattern, the blue pattern, and the white pattern including the plurality of reference grayscale patterns may be captured by the camera CAM to generate a plurality of reference data RD.

The camera CAM embedded in the second active area AA2 may capture the test pattern TA displayed in the first active area AA1 so that the reference data RD may vary depending on the distance measurement value D between the first active area AA1 and the second active area AA2. Accordingly, the reference data RD may vary depending on the distance measurement value D.

The data comparator 142 may compare the reference data RD and the captured data CD to output comparison data CPD. Specifically, the data comparator 142 may receive the reference data RD from the reference data memory 141 and the captured data CD from the camera CAM to compare the reference data and the captured data and may generate the comparison data CPD. Only when the level of the comparison data CPD is equal to or higher than a threshold level, the comparison data CPD may be output to the data driver 130.

As described above, each of the reference data RD and the captured data CD may be set to be different depending on the measured distance value so that the reference data RD and the captured data CD may be compared based on the same measured distance value D. For example, reference data RD when the measured distance value D is 1 mm may be compared to captured data CD when the measured distance value D is 1 mm to calculate comparison data CPD when the measured distance value D is 1 mm.

The compensation timer 143 may receive the comparison data CPD and determine a generation period of the captured data CD. That is, the period when the camera CAM captures the test pattern TA may vary according to a level of the comparison data CPD. That is, the higher the level of the comparison data CPD, the shorter the generation period of the captured data CD.

For example, at the first measurement timing, when the reference data RD is 900, if the captured data CD is 850, the comparison data CPD may be 50. In this case, the generation period of the captured data CD may be set to be relatively long, such as one month.

Next, at the second measurement timing, when the reference data RD is 900, if the captured data CD is 750, the comparison data CPD may be 150. In this case, the generation period of the captured data CD may be set to be relatively short, such as one day.

Next, at the third measurement timing, when the reference data RD is 900, if the captured data CD is 700, the comparison data CPD may be 200. If the threshold level is 200, the level of the comparison data CPD is equal to or exceeds the threshold level so that, in this case, the comparison data CPD may be output to the data driver 130 to perform degradation compensation.

The above-described degradation compensation may be performed according to a predetermined period so that the degradation compensation may be performed, for example, during a bedtime. Alternatively, a user may set the starting time of the degradation compensation so as not to interrupt the use of the foldable display device.

Hereinafter, a specific configuration and a connection relationship of a data driver for performing the degradation compensation using the comparison data CPD according to an example embodiment of the present disclosure will be specifically described.

Figure 5:
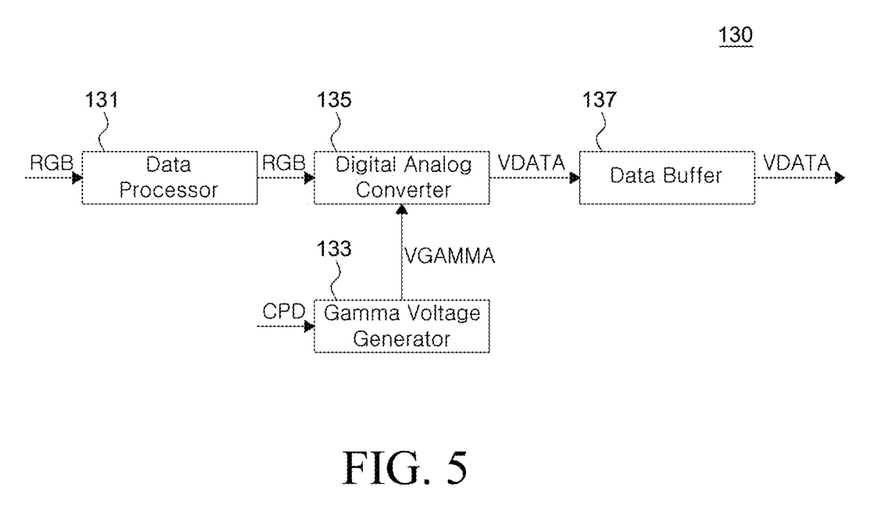
FIG. 5 is a block diagram for explaining a data driver of a foldable display device according to an example embodiment of the present disclosure.

FIG. 5 is a block diagram for explaining a data driver of a foldable display device according to an example embodiment of the present disclosure.

The data driver 130 may include a data processor 131, a gamma voltage generator 133, a digital-to-analog converter (DAC) 135, and a data buffer 137.

The data processor 131 may convert image data RGB received from the timing controller 140 to be processible in the data driver 130.

Specifically, the data processor 131 may include various circuits, such as a shift register and a plurality of latch units.

In the data processor 131, the shift register may shift a sampling signal according to a source sampling clock of a data control signal. Further, when data exceeding the number of latches of the latch unit is supplied, the shift register may generate a carry signal.

The plurality of latch units may sample image data RGB from the timing controller 140 in response to the sampling signal sequentially input from the shift register, may latch the image data RGB for one horizontal line, and then may simultaneously output the image data for one horizontal line during a turn-on level period of the source output enable signal.

The gamma voltage generator 133 may divide a plurality of gamma reference voltages as many as the gray scales expressible by a number of bits of the image data RGB to generate a plurality of gamma voltages VGAMMA each corresponding to a respective one of the gray scales.

The gamma voltage generator of the foldable display device according to an example embodiment of the present disclosure may set the plurality of gamma reference voltages to be different from each other according to the comparison data CPD, which will be described with reference to FIG. 6.

The DAC 135 may decode the digital image data RGB input from the data processor 131 to output an analog gamma voltage VGAMMA corresponding to a grayscale value of the image data RGB as a data voltage VDATA.

The data buffer 137 may include a plurality of buffers respectively connected to the data lines DL one to one to minimize the signal attenuation of the analog data signal VDATA supplied from the DAC 135.

By means of a series of above-described processes, the data driver 130 of the foldable display device 100 according to an example embodiment of the present disclosure may output the data voltage VDATA to the plurality of data lines DL.

Hereinafter, a configuration and an operation of a gamma voltage generator according to an example embodiment of the present disclosure will be described in detail with reference to FIG. 6.

Figure 6:
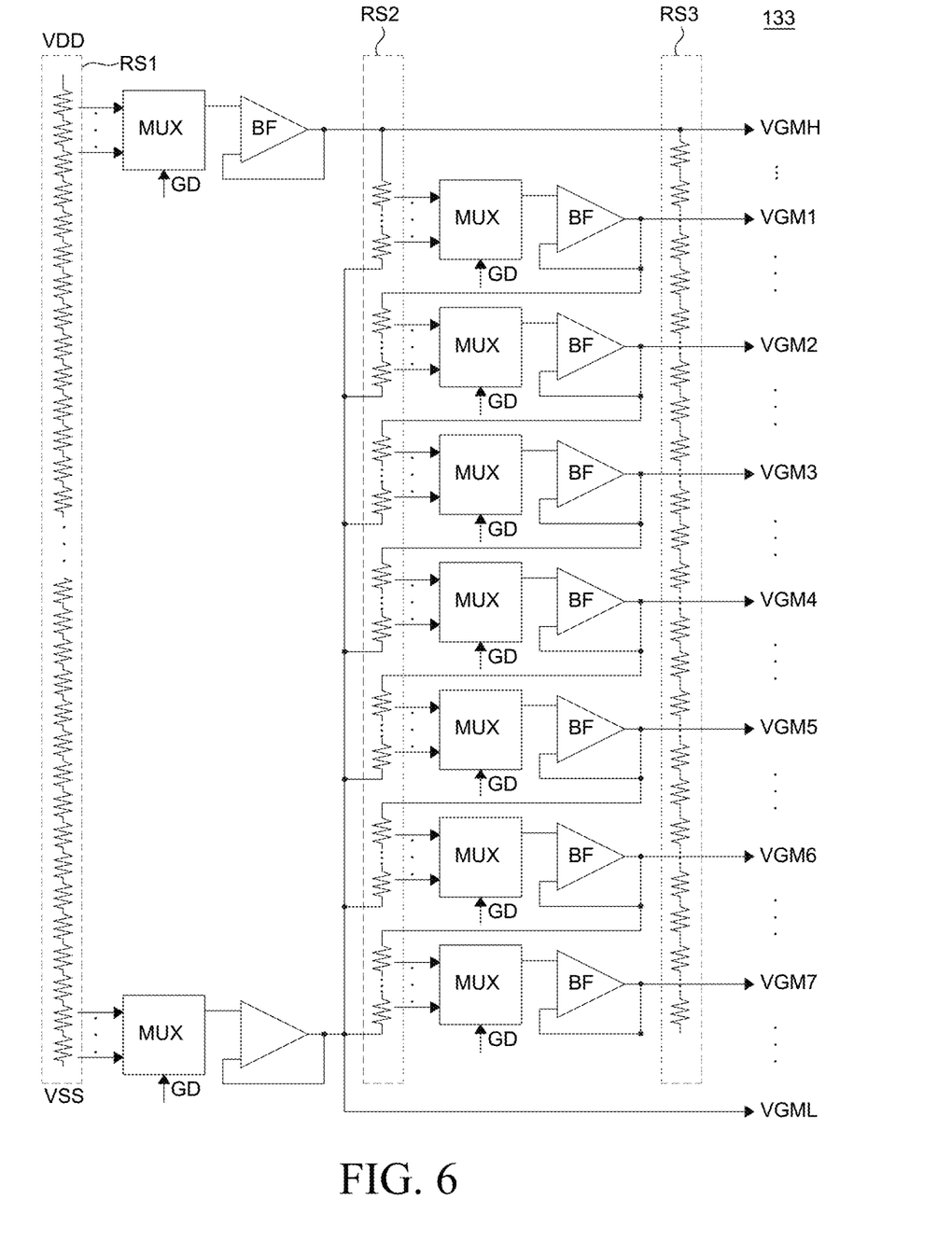
FIG. 6 is a circuit diagram for explaining a gamma voltage generator of a foldable display device according to an example embodiment of the present disclosure.

FIG. 6 is a circuit diagram for explaining a gamma voltage generator of a foldable display device according to an example embodiment of the present disclosure.

As illustrated in FIG. 6, the gamma voltage generator 133 may include a plurality of resistance strings RS1, RS2, RS3, a plurality of multiplexers (MUXs) configured to select some of the divided voltages as a plurality of gamma reference voltages VGML, VGMH, VGM1 to VGM7, respectively, and a plurality of output buffers BF. The plurality of resistance strings RS1, RS2, RS3 may divide a high potential voltage VDD and a low potential voltage VSS into a plurality of gamma voltages, and the plurality of output buffers BF may output a plurality of gamma voltages.

Specifically, the gamma voltage generator 133 may include a first resistance string RS1, a plurality of second resistance strings RS2, a third resistance string RS3, a plurality of MUXs, and the plurality of output buffers BF. The first resistance string RS1 may divide the high potential voltage VDD and the low potential voltage VSS. The plurality of second resistance strings RS2 may divides a highest gamma voltage VGMH and a lowest gamma voltage VGML. The third resistance string RS3 may divide the plurality of gamma reference voltages VGML, VGMH, VGM1 to VGM7. The plurality of MUXs may select the gamma reference voltages VGML, VGMH, VGM1 to VGM7, and the plurality of output buffers BF may output the gamma reference voltages VGML, VGMH, VGM1 to VGM7. The above-described highest gamma voltage VGMH and lowest gamma voltage VGML may be among the plurality of gamma reference voltages.

The first resistance string RS1 may divide the high potential voltage VDD and the low potential voltage VSS.

Some divided voltages, including the high potential voltage VDD, among the divided voltages between the high potential voltage VDD and the low potential voltage VSS may be input to a corresponding MUX. The MUX may select any one of these input divided voltages, including the high potential voltage VDD, to output the selected voltage as a highest gamma voltage through the corresponding output buffer BF.

Some divided voltages, including the low potential voltage VSS, among the divided voltages between the high potential voltage VDD and the low potential voltage VSS may be input to another MUX. This MUX may select any one of these input divided voltages, including the low potential voltage VSS, to output the selected voltage as a lowest gamma voltage VGML through the corresponding output buffer BF.

The second resistance string RS2 may divide the highest gamma voltage VGMH and the lowest gamma voltage VGML.

Some of the voltages between the highest gamma voltage VGMH and the lowest gamma voltage VGML may be input to a corresponding MUX. The corresponding MUX may select one of the divided voltages to output the selected voltage as a first gamma reference voltage VGM1 by means of the corresponding output buffer BF. Some of the voltages between the first gamma reference voltage VGM1 and the lowest gamma voltage VGML may be input to another MUX. This MUX may select one of these divided voltages to output the selected voltage as a second gamma reference voltage VGM2 by means of the corresponding output buffer BF. Some of the voltages between the second gamma reference voltage VGM2 and the lowest gamma voltage VGML may be input to yet another MUX. This MUX may select one of these divided voltages to output the selected voltage as a third gamma reference voltage VGM3 by means of the corresponding output buffer BF. Some of the voltages between the third gamma reference voltage VGM3 and the lowest gamma voltage VGML may be input to another MUX. The MUX may select one of the divided voltages to output the selected voltage as a fourth gamma reference voltage VGM4 by means of the corresponding output buffer BF. Some of the voltages between the fourth gamma reference voltage VGM4 and the lowest gamma voltage VGML may be input to yet another MUX. The MUX may select one of the divided voltages to output the selected voltage as a fifth gamma reference voltage VGM5 by means of the corresponding output buffer BF. Some of the voltages between the fifth gamma reference voltage VGM5 and the lowest gamma voltage VGML may be input to another MUX. The MUX may select one of the divided voltages to output the selected voltage as a sixth gamma reference voltage VGM6 by means of the corresponding output buffer BF. Some of the voltages between the sixth gamma reference voltage VGM6 and the lowest gamma voltage VGML may be input to yet another MUX. The MUX may select one of the divided voltages to output the selected voltage as a seventh gamma reference voltage VGM7 by means of the corresponding output buffer BF.

For example, the above-described lowest gamma voltage VGML may be a gamma voltage corresponding to gray scale 1, the seventh gamma reference voltage VGM7 may be a gamma voltage corresponding to gray scale 4, and the sixth gamma reference voltage VGM6 may be a gamma voltage corresponding to gray scale 7. Also, for example, the fifth gamma reference voltage VGM5 may be a gamma voltage corresponding to gray scale 15, and the fourth gamma reference voltage VGM4 may be a gamma voltage corresponding to gray scale 31. For example, the third gamma reference voltage VGM3 may be a gamma voltage corresponding to gray scale 63, and the second gamma reference voltage VGM2 may be a gamma voltage corresponding to gray scale 127. Also, for example, the first gamma reference voltage VGM1 may be a gamma voltage corresponding to gray scale 191, and the maximum gamma voltage VGMH may be a gamma voltage corresponding to gray scale 255.

The third resistance string RS3 may divide the plurality of gamma reference voltages VGM to generate a plurality of gamma voltages corresponding to the plurality of gray scales, respectively.

Each of the plurality of MUXs may be controlled by the gamma data GD. The gamma data GD may be updated by the comparison data CPD.

For example, for the maximum gray scale (gray scale 255), if the comparison data CPD for the red test pattern is 100, the gamma data GD for the maximum gray scale in the red sub pixel may be changed from 5000 to 5100. For the maximum gray scale (gray scale 255), if the comparison data CPD for the green test pattern is 300, the gamma data GD for the maximum gray scale in the green sub pixel may be changed from 5000 to 5300. For the maximum gray scale (gray scale 255), if the comparison data CPD for the blue test pattern is 400, the gamma data GD for the maximum gray scale in the blue sub pixel may be changed from 5000 to 5400.

For example, for the maximum gray scale (gray scale 255), if the comparison data CPD for the white test pattern is 200, gamma data GD for the maximum gray scale in the red sub pixel may be re-changed from 5000 to 5120, gamma data GD for the maximum gray scale in the green sub pixel may be re-changed from 5300 to 5290, and gamma data GD for the maximum gray scale in the blue sub pixel may be re-changed from 5400 to 5410. By doing this, the compensation for the white test pattern may also be performed.

The update of the gamma data GD according to the comparison data CPD may be repeated for each of the plurality of gamma reference voltages VGML, VGMH, VGM1 to VGM7. Therefore, the plurality of gamma reference voltages VGML, VGMH, VGM1 to VGM7 may be changed or updated by reflecting the comparison data CPD, and the gamma voltage VGAMMA generated from the plurality of gamma reference voltages VGML, VGMH, VGM1 to VGM7 may also be changed or updated by reflecting the comparison data CPD.

The DAC 135 may output the updated gamma voltage VGAMMA corresponding to the grayscale value of the image data RGB as a data voltage VDATA. By means of a series of above-described processes, the data driver 130 of the foldable display device 100 according to an example embodiment of the present disclosure may output the data voltage VDATA compensated according to the comparison data CPD. That is, the degradation information measured from the test pattern TA may be reflected in the data voltage VDATA output to the plurality of active areas AA to perform the global compensation.

As described above, the foldable display device according to an example embodiment of the present disclosure may capture the test pattern using a built-in camera to perform the degradation compensation.

Accordingly, it may not be necessary for the foldable display device according to an example embodiment of the present disclosure to include a separate camera to compensate for the degradation. Thus, the degradation may be regularly compensated even after the product shipment.

The foldable display device according to an example embodiment of the present disclosure may perform the degradation compensation in a folded state in which the user does not use the foldable display device. Thus, such an example foldable display device has an advantage in that it is not necessary to secure a separate degradation compensation time.

Hereinafter, a display device according to another example embodiment of the present disclosure will be described. The primary difference between this example embodiment of the present disclosure and the example embodiment of the present disclosure described above is in a data driver so that the data driver will be mainly described. The description of portions of this example embodiment of the present disclosure duplicative of the example embodiment described above will not be repeated.

Figure 7:
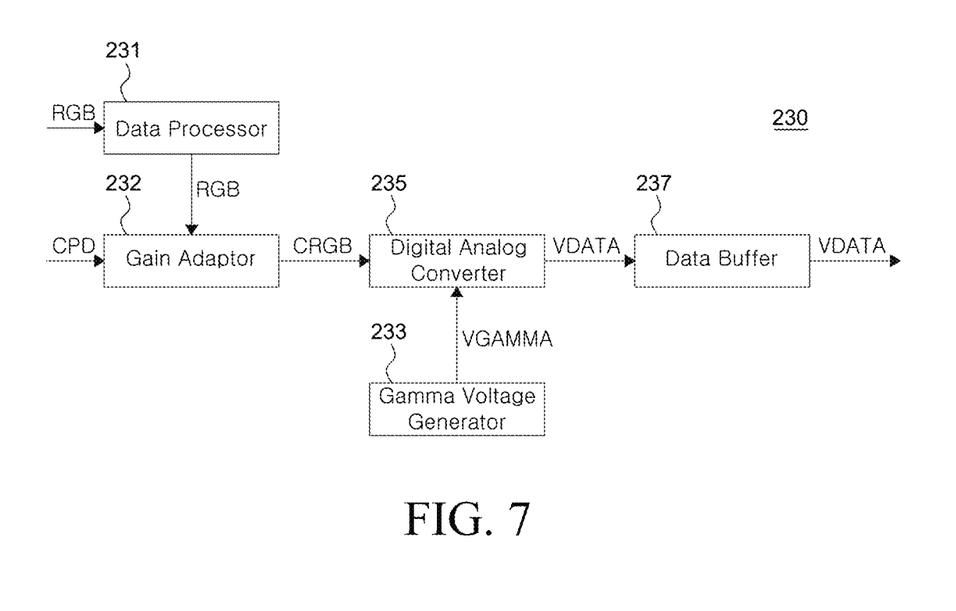
FIG. 7 is a block diagram for explaining a data driver of a foldable display device according to another example embodiment of the present disclosure.

FIG. 7 is a block diagram for explaining a data driver of a foldable display device according to another example embodiment of the present disclosure.

The data driver 230 may include a data processor 231, a gain adaptor 232, a gamma voltage generator 233, a digital-to-analog converter (DAC) 135, and a data buffer 237.

The data processor 231 may convert image data RGB received from the timing controller 140 to be processible in the data driver 230.

Specifically, the data processor 231 may include various circuits, such as a shift register and a plurality of latch units.

In the data processor 231, the shift register may shift a sampling signal according to a source sampling clock of a data control signal. Further, when data exceeding the number of latches of the latch unit is supplied, the shift register may generate a carry signal.

The plurality of latch units may sample image data RGB from the timing controller 140 in response to the sampling signal sequentially input from the shift register, may latch the image data RGB for one horizontal line, and then may simultaneously output the image data for one horizontal line during a turn-on level period of the source output enable signal.

The gain adaptor 232 may compensate for the image data RGB according to the comparison data CPD.

Specifically, the gain adaptor 232 may determine a gain according to the comparison data CPD and may apply the gain to the image data RGB to compensate for the image data RGB.

The gain may be set by a ratio of the comparison data CPD and the reference data RD or may be set as a gain stored in a look up table (LUT) corresponding to the comparison data CPD.

For example, for the maximum gray scale (gray scale 255), if the reference data RD is 5000 and the comparison data CPD is 100, the gain may be 1.02 (=1+100/5000). The gain of 1.02 may be applied to the image data RGB to output the compensated image data CRGB.

The gamma voltage generator 233 may divide a plurality of gamma reference voltages as many as the gray scales expressible by a number of bits of the compensated image data CRGB to generate a plurality of gamma voltages VGAMMA respectively corresponding to the plurality of gray scales.

The DAC 235 may decode the digital compensated image data CRGB input from the data processor 231 to output an analog gamma voltage VGAMMA corresponding to a gray-scale value of the compensated image data CRGB as a data voltage VDATA.

The data buffer 237 may include a plurality of buffers connected to the data lines DL one to one to minimize the signal attenuation of the analog data voltage VDATA supplied from the DAC 125.

By means of a series of above-described processes, the data driver 230 of the foldable display device according to another example embodiment of the present disclosure may output the data voltage VDATA compensated according to the comparison data CPD. That is, the degradation information measured from the test pattern TA may be reflected in the data voltage VDATA output to the plurality of active areas AA to perform the global compensation.

As described above, the foldable display device according to another example embodiment of the present disclosure may also capture the test pattern using the built-in camera to perform the degradation compensation.

Accordingly, it may not be necessary for the foldable display device according to the example embodiment of the present disclosure to include a separate camera to compensate for the degradation. Thus, the degradation may be regularly compensated even after the product shipment.

Further, the foldable display device according to another example embodiment of the present disclosure may also perform the degradation compensation in a folded state in which the user does not use the foldable display device. Thus, such an example foldable display device has an advantage in that it is not necessary to secure a separate degradation compensation time.

Hereinafter, a driving method of a foldable display device according to an example embodiment of the present disclosure will be described. The driving method of the foldable display device according to an example embodiment of the present disclosure will be described on the basis of the foldable display device according to the example embodiments of the present disclosure described above. Therefore, the driving method of the foldable display device according to an example embodiment of the present disclosure will be described with reference to FIGS. 1 to 7 as well as to FIG. 8.

Figure 8:
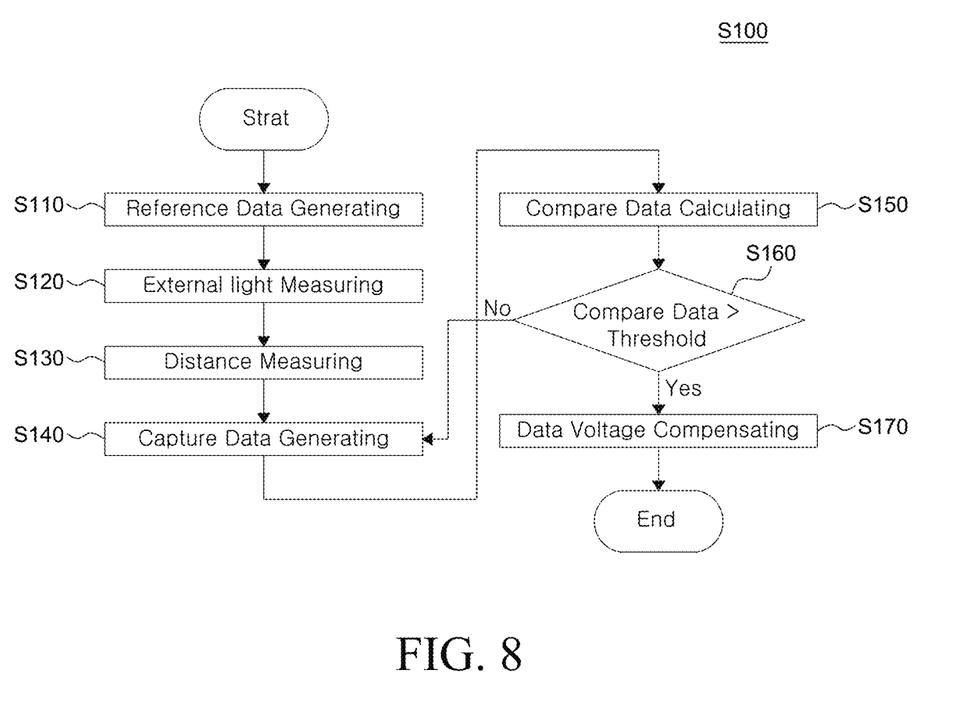
FIG. 8 is a flowchart for explaining a driving method of a foldable display device according to an example embodiment of the present disclosure.

FIG. 8 is a flowchart for explaining a driving method of a foldable display device according to an example embodiment of the present disclosure.

As illustrated in FIG. 8, the driving method S100 of a foldable display device according to an example embodiment of the present disclosure may include a step S110 of generating reference data, a step S120 of measuring external light, a step S130 of measuring a distance between a plurality of active areas, a step S140 of generating captured data, a step S150 of calculating comparison data, a step S160 of measuring and comparing a level of comparison data with a threshold level, and a step S170 of compensating for a data voltage.

In the step S110 of generating reference data, the camera CAM may capture the test pattern in an initial state of the foldable display device 100 to store reference data RD.

The initial state of the foldable display device may refer to a time when the foldable display device is shipped. That is, in the initial state, the light emitting diode of the foldable display device is not degraded so that the plurality of pixels may be normally driven.

The above-described test pattern TA may be configured by a red pattern, a green pattern, a blue pattern, and a white pattern including a plurality of reference grayscale patterns. Therefore, each of the red pattern, the green pattern, the blue pattern, and the white pattern including the plurality of reference grayscale patterns may be captured by the camera CAM to generate a plurality of reference data RD.

After the step S110 of generating reference data, in the step S120 of measuring external light, an illumination sensor PR may measure external light. Specifically, in the step S120 of measuring external light, the illumination sensor PR may determine the presence of external light, and the camera CAM may capture the test pattern TA to perform a step S140 of generating captured data only when there is no external light above a threshold value. In other words, in the step S120 of measuring external light, only when the measured external light value generated by the illumination sensor PR measuring the external light is equal to or lower than an external light threshold value, the camera CAM may perform the step S140 of capturing the test pattern TA to generate the captured data CD.

When the measured external light value is higher than the external light threshold value, the camera CAM may measure not only light emitted by the test pattern, but also external light. Therefore, only when the measured external light value is equal to or lower than the external light threshold value, the camera CAM may capture the test pattern TA to accurately generate the captured data CD.

After the step S120 of measuring external light, in the step S130 of measuring a distance between the plurality of active areas, the infrared sensor IRS may measure a distance D between the first active area AA1 and the second active area AA2. Specifically, in the step S130 of measuring a distance between the plurality of active areas, only when the measured distance value D between the first active area AA1 and the second active area AA2 measured by the infrared sensor IRS is equal to or lower than the distance threshold value, the camera CAM may perform the step S140 of capturing the test pattern TA to generate the captured data CD.

When the measured distance value D is higher than the distance threshold value, the camera CAM may measure not only light emitted by the test pattern TA, but also the external light, due to the greater space between the first active area AA1 and the second active area AA2. Therefore, only when the distance measurement value D is equal to or lower than the distance threshold value, the camera CAM may capture the test pattern TA to accurately generate the captured data CD.

In the step S140 of generating captured data, the camera CAM may capture the test pattern TA displayed in the first active area AA1 to generate captured data CD.

The above-described test pattern TA may be configured by a red pattern, a green pattern, a blue pattern, and a white pattern including a plurality of reference grayscale patterns. Therefore, each of the red pattern, the green pattern, the blue pattern, and the white pattern including the plurality of reference grayscale patterns may be captured by the camera CAM to generate a plurality of captured data CD.

In the step S150 of calculating comparison data, the reference data RD and the captured data CD may be compared to output comparison data CPD. Specifically, in the step S150 of calculating comparison data, reference data RD generated from the step S110 of generating reference data and captured data CD generated from the step S140 of generating captured data may be compared to calculate comparison data CPD. For example, when the reference data RD is 900, if the captured data CD is 700, the comparison data CPD may be 200.

In the step S160 of measuring and comparing a level of comparison data with a threshold level, a level of the comparison data CPD may be measured and compared with a threshold level.

When the level of the comparison data CPD is equal to or higher than the threshold level, the step S170 of compensating the data voltage is performed. When the level of the comparison data CPD is lower than the threshold level, the step S140 of generating captured data is periodically performed.

When the level of the comparison data CPD is lower than the threshold level, the higher the level of the comparison data CPD, the shorter the cycle of the step S140 of generating captured data CD.

For example, in the step S160 of measuring a level of first comparison data, when the reference data RD is 900, if the captured data CD is 850, the comparison data CPD may be 50. In this case, the period of the step S140 of generating captured data CD may be set to be relatively long, such as one month.

Next, in the step S160 of measuring a level of second comparison data, when the reference data RD is 900, if the captured data CD is 750, the comparison data CPD may be 150. In this case, the period of the step S140 of generating captured data CD may be set to be relatively short, such as one day.

Thereafter, in the step S160 of measuring a level of third comparison data, when the reference data RD is 900, if the captured data CD is 700, the comparison data CPD may be 200. When the threshold level is 200, the level of the comparison data CPD is equal to or exceeds the threshold level so that the step S170 of compensating the data voltage may be performed.

In the step S170 of compensating the data voltage, the degradation of the plurality of pixels may be compensated using the comparison data CPD.

The above-described degradation compensation may be performed according to a predetermined period so that the degradation compensation may be performed, for example, during the bedtime. Alternatively, a user may set the starting time of the degradation compensation so as not to interrupt the use of the foldable display device.

As described above with reference to FIG. 6, in the step S170 of compensating data voltage, the plurality of gamma reference voltages VGML, VGMH, VGM1 to VGM7 may be changed or updated by reflecting the comparison data CPD, and gamma voltage VGAMMA generated from the plurality of gamma reference voltages VGML, VGMH, VGM1 to VGM7 may also be changed or updated by reflecting the comparison data CPD.

As shown in FIG. 5, the DAC 135 may output the updated gamma voltage VGAMMA corresponding to the grayscale value of the image data RGB as a data voltage VDATA. By means of a series of above-described processes, in the step S170 of compensating data voltage, data voltage VDATA compensated according to the comparison data CPD may be output.

Alternatively, as described above with reference to FIG. 7, in the step S170 of compensating data voltage, a gain may be determined according to the comparison data CPD and may be applied to the image data RGB to compensate for the image data RGB.

The DAC 235 may decode the digital compensated image data CRGB input from the data processor 231 to output an analog gamma voltage VGAMMA corresponding to a grayscale value of the compensated image data CRGB as a data voltage VDATA. By means of a series of above-described processes, in the step S170 of compensating data voltage, data voltage VDATA compensated according to the comparison data CPD may be output.

Example embodiments of the present disclosure may also be described as follows:

According to an example embodiment of the present disclosure, a foldable display device may include: a display panel including a first active area, a second active area, and a foldable area between the first active area and the second active area for folding and unfolding the display panel; and a camera in the second active area or overlapping with the second active area. The first active area may be configured to display a test pattern, and the camera may be configured to capture the test pattern to output captured data for compensating a data voltage applied to at least one of the first active area and the second active area of the display panel for displaying an image.

In some example embodiments, the camera may be further configured to capture the test pattern to output the captured data at a timing set based on a degradation level of the test pattern.

In some example embodiments, the camera may be further configured to output the captured data based on at least one of a distance between the first active area and the second active area and an amount of external light incident on the display panel.

In some example embodiments, with the display panel fully folded, the test pattern and the camera may overlap each other.

In some example embodiments, the foldable display device may further include: a data driver configured to output the data voltage to a plurality of pixels disposed in the first active area and the second active area; and a timing controller configured to compare the captured data with reference data to output comparison data. The data driver may be configured to compensate for the data voltage based on the comparison data.

In some example embodiments, the reference data may correspond to the test pattern captured at an initial state of the foldable display device.

In some example embodiments, the timing controller may include: a reference data memory storing the reference data; and a data comparator configured to compare the reference data and the captured data to generate the comparison data.

In some example embodiments, the timing controller may further include a compensation timer configured to receive the comparison data and to determine, based on the comparison data, a generation cycle at which the camera is configured to capture the test pattern to generate the captured data.

In some example embodiments, the higher the comparison data, the shorter the generation cycle of the captured data may be.

In some example embodiments, the timing controller may be further configured to output the comparison data to the data driver if the comparison data is equal to or higher than a threshold level.

In some example embodiments, the foldable display device may further include an infrared sensor disposed in the first active area or the second active area, the infrared sensing being configured to measure a distance between the first active area and the second active area to output a measured distance value.

In some example embodiments, the camera may be configured to output the captured data if the measured distance value is equal to or lower than a distance threshold value.

In some example embodiments, each of the captured data and the reference data may be set based on the measured distance value.

In some example embodiments, the foldable display device may further include an illumination sensor disposed in the first active area or the second active area, the illumination sensor being configured to measure an amount of external light incident on the display panel.

In some example embodiments, the camera may be configured to capture the test pattern to generate the captured data if the measured amount of external light is equal to or smaller than an external light threshold value.

In some example embodiments, the data driver may include: a data processor configured to receive and process image data; a gamma voltage generator configured to generate a plurality of gamma voltages; a digital-to-analog converter configured to convert one of the gamma voltages corresponding to a grayscale value of the image data into the data voltage; and a data buffer configured to output the data voltage.

In some example embodiments, the gamma voltage generator may include: a plurality of resistance strings configured to generate a plurality of divided voltages between a high potential voltage and a low potential voltage; a plurality of multiplexers (MUXs) configured to select some of the divided voltages as a plurality of gamma reference voltages; and a plurality of output buffers configured to output the plurality of gamma reference voltages, respectively. The plurality of MUXs may be configured to be controlled by corresponding gamma data which is updated based on the comparison data.

In some example embodiments, the data driver may further include a gain adaptor configured to compensate the image data based on the comparison data. The digital-to-analog converter may be configured to convert one of the gamma voltages corresponding to a grayscale value of the compensated image data into the data voltage.

According to an example embodiment of the present disclosure, a method of driving a foldable display device including a display panel having a first active area, a second active area, and a foldable area between the first active area and the second active area, and a camera in or overlapping with the second active area, may include: displaying a test pattern in one or more regions of the first active area; capturing the test pattern with the camera to generate captured data; determining comparison data by comparing the captured data with stored reference data; and based on the comparison data, compensating a data voltage applied to at least one of the first active area and the second active area of the display panel for displaying an image or setting a next time period for the capturing of the test pattern to generate the captured data.

In some example embodiments, the method may further include determining at least one of a distance between the first active area and the second active area of the display panel and an amount of external light incident on the display panel. The capturing of the test pattern to generate the captured data may include determining whether to capture the test pattern to generate the captured data based on at least one of the distance and the amount of external light.

Although example embodiments of the present disclosure have been described in detail with reference to the accompanying drawings, the present disclosure is not limited thereto and may be embodied in many different forms without departing from the technical concept of the present disclosure. Therefore, example embodiments of the present disclosure are provided for illustrative purposes only and not intended to limit the technical concept of the present disclosure. The scope of the technical concept of the present disclosure is not limited thereto. Therefore, it should be understood that the above-described example embodiments are illustrative in all aspects and do not limit the present disclosure. The protective scope of the present disclosure should be construed based on the following claims, and all the technical concepts in the equivalent scope thereof should be construed as falling within the scope of the present disclosure.

It will be apparent to those skilled in the art that various modifications and variations can be made in the present disclosure without departing from the technical idea or scope of the disclosures. Thus, it is intended that embodiments of the present disclosure cover the modifications and variations of the disclosure provided they come within the scope of the appended claims and their equivalents.

What is claimed is:

1. A foldable display device, comprising:
a display panel including a first active area, a second active area, and a foldable area between the first active area and the second active area for folding and unfolding the display panel; and
a camera in the second active area or overlapping with the second active area,
wherein the first active area is configured to display a test pattern, and the camera is configured to capture the test pattern to output captured data for compensating a data voltage applied to at least one of the first active area and the second active area of the display panel for displaying an image.

2. The foldable display device of claim 1,
wherein the camera is further configured to capture the test pattern to output the captured data at a timing set based on a degradation level of the test pattern.

3. The foldable display device of claim 1,
wherein the camera is further configured to output the captured data based on at least one of a distance between the first active area and the second active area and an amount of external light incident on the display panel.

4. The foldable display device of claim 1,
wherein, with the display panel fully folded, the test pattern and the camera overlap each other.

5. The foldable display device of claim 1, further comprising:
a data driver configured to output the data voltage to a plurality of pixels disposed in the first active area and the second active area; and
a timing controller configured to compare the captured data with reference data to output comparison data,
wherein the data driver is configured to compensate for the data voltage based on the comparison data.

6. The foldable display device of claim 5,
wherein the reference data corresponds to the test pattern captured at an initial state of the foldable display device.

7. The foldable display device of claim 5, wherein the timing controller includes:
a reference data memory storing the reference data; and a data comparator configured to compare the reference data and the captured data to generate the comparison data.

8. The foldable display device of claim 7,
wherein the timing controller further includes a compensation timer configured to receive the comparison data and to determine, based on the comparison data, a generation cycle at which the camera is configured to capture the test pattern to generate the captured data.

9. The foldable display device according to claim 8,
wherein, the higher the comparison data, the shorter the generation cycle of the captured data.

10. The foldable display device of claim 7,
wherein the timing controller is further configured to output the comparison data to the data driver if the comparison data is equal to or higher than a threshold level.

11. The foldable display device of claim 5, further comprising:
an infrared sensor disposed in the first active area or the second active area, the infrared sensing being configured to measure a distance between the first active area and the second active area to output a measured distance value.

12. The foldable display device of claim 11,
wherein the camera is configured to output the captured data if the measured distance value is equal to or lower than a distance threshold value.

13. The foldable display device of claim 12,
wherein each of the captured data and the reference data is set based on the measured distance value.

14. The foldable display device of claim 5, further comprising:
an illumination sensor disposed in the first active area or the second active area, the illumination sensor being configured to measure an amount of external light incident on the display panel.

15. The foldable display device of claim 14,
wherein the camera is configured to capture the test pattern to generate the captured data if the measured amount of external light is equal to or smaller than an external light threshold value.

16. The foldable display device of claim 5, wherein the data driver includes:
a data processor configured to receive and process image data;
a gamma voltage generator configured to generate a plurality of gamma voltages;
a digital-to-analog converter configured to convert one of the gamma voltages corresponding to a grayscale value of the image data into the data voltage; and
a data buffer configured to output the data voltage.

17. The foldable display device of claim 16, wherein the gamma voltage generator includes:
a plurality of resistance strings configured to generate a plurality of divided voltages between a high potential voltage and a low potential voltage;
a plurality of multiplexers (MUXs) configured to select some of the divided voltages as a plurality of gamma reference voltages; and
a plurality of output buffers configured to output the plurality of gamma reference voltages, respectively,
wherein the plurality of MUXs is configured to be controlled by corresponding gamma data which is updated based on the comparison data.

18. The foldable display device of claim 16, wherein the data driver further includes:
a gain adaptor configured to compensate the image data based on the comparison data,
wherein the digital-to-analog converter is configured to convert one of the gamma voltages corresponding to a grayscale value of the compensated image data into the data voltage.

19. A method of driving a foldable display device including a display panel having a first active area, a second active area, and a foldable area between the first active area and the second active area, and a camera in or overlapping with the second active area, the method comprising:
displaying a test pattern in one or more regions of the first active area;
capturing the test pattern with the camera to generate captured data;
determining comparison data by comparing the captured data with stored reference data; and
based on the comparison data, compensating a data voltage applied to at least one of the first active area and the second active area of the display panel for displaying an image or setting a next time period for the capturing of the test pattern to generate the captured data.

20. The method of claim 19, further comprising:
determining at least one of a distance between the first active area and the second active area of the display panel and an amount of external light incident on the display panel,
wherein the capturing of the test pattern to generate the captured data includes determining whether to capture the test pattern to generate the captured data based on at least one of the distance and the amount of external light.

* * * * *